May 31, 1927.
W. M. FREDENBURG
1,630,840
ACCOUNT SYSTEM
Filed April 20, 1925    2 Sheets-Sheet 1
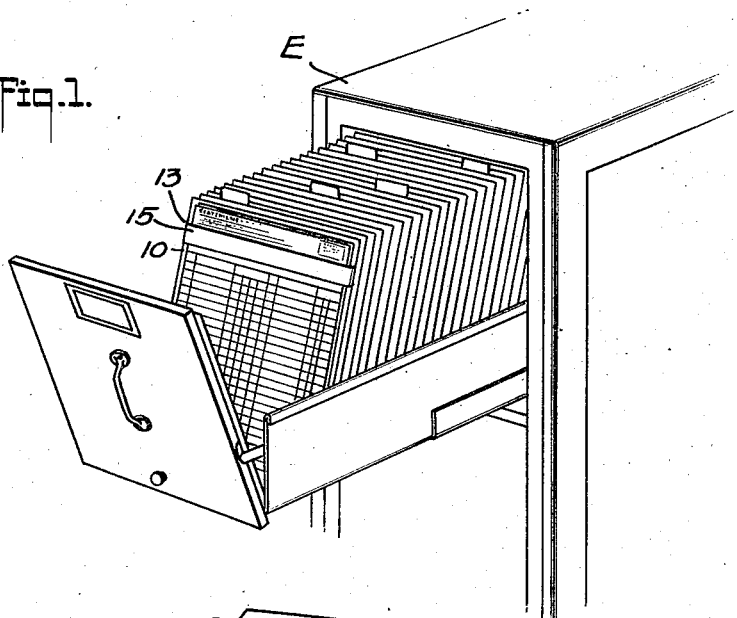
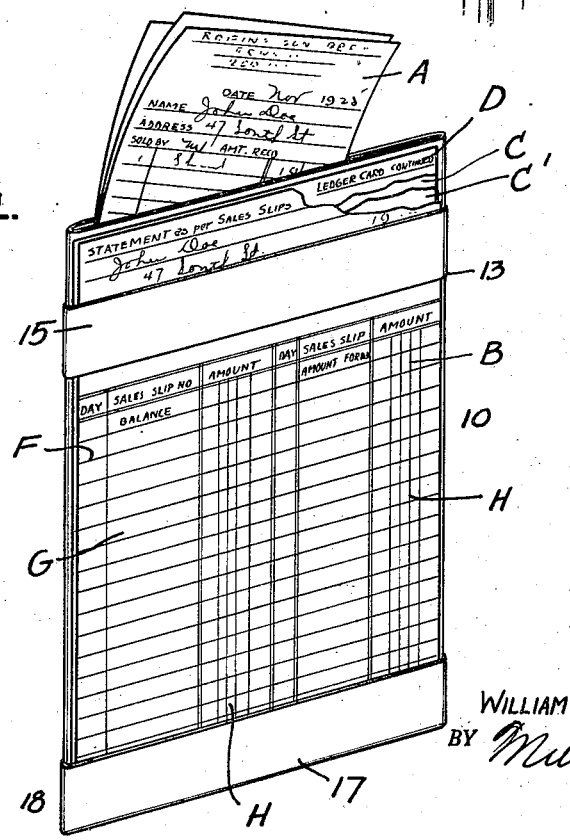
INVENTOR.
WILLIAM M. FREDENBURG
BY Munn & Co.
ATTORNEYS.

May 31, 1927.
W. M. FREDENBURG
ACCOUNT SYSTEM
Filed April 20, 1925    2 Sheets-Sheet 2
1,630,840
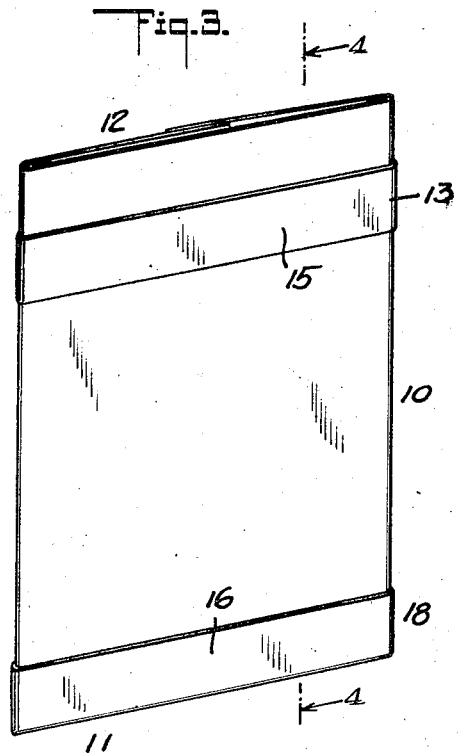
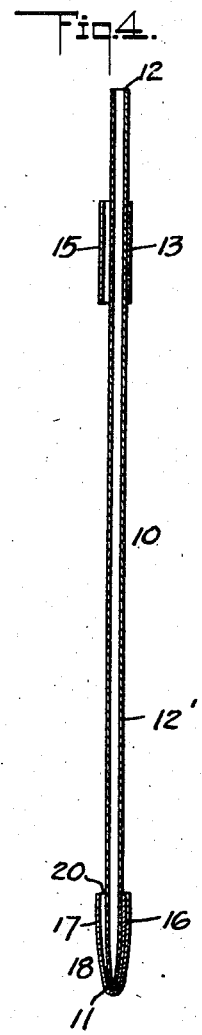
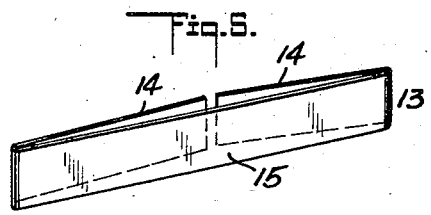
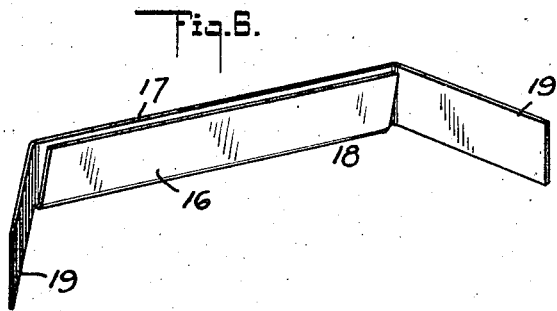
INVENTOR.
WILLIAM M. FREDENBURG
BY *Munn & Co.*
ATTORNEYS.

Patented May 31, 1927.

1,630,840

UNITED STATES PATENT OFFICE.

WILLIAM M. FREDENBURG, OF PASO ROBLES, CALIFORNIA.

ACCOUNT SYSTEM.

Application filed April 20, 1925. Serial No. 24,573.

This invention relates to account systems and has for its primary object the provision of a system of this kind characterized by means or instrumentalities whereby all documents and bookkeeping records used in an ordinary business or mercantile transaction may be associated as a unit and indexed for easy and quick reference and at least one of said documents utilized as true and appropriate indicia in an alphabetical indexing of separate accounts, and whereby accurate records of account can be kept without the necessity of the usual forms of (1) day book and (2) ledger.

A further object of the invention is to provide a system of this character wherein all records of account may be assembled and indexed for easy and quick reference, and wherein, and incident to the steps employed in carrying my system into practice, each unit of the system will have visually arranged thereon, respectively, the original and a duplicate of a chronological statement of the complete account of a customer or buyer, so that at the close of a month or other period a true and complete statement may be given or mailed the customer without the necessity of further booking or billing.

A further object of my invention is to provide a system of this character wherein each unit shall be in the form of a receptacle within which original "sales slips" are placed and arranged to tally with a record of account exteriorly of the unit, the latter adapted to be employed as indexing means, and wherein the transactions entered on the original sales slips constitute a true statement of a particular alphabetical account, so as to save the time usually incident to making out of statements from the many accounts in a book ledger, which, so to speak, jams the end of a month and causes confusion and extra clerical labor.

In the accompanying drawings,

Figure 1 is a perspective view illustrating the manner of filing and indexing a series of accounts;

Figure 2 is a perspective view of one of the envelopes or account units illustrating the order of arrangement of the documents;

Figure 3 is a perspective view of the envelope or unit with the documents removed;

Figure 4 is a vertical section on line 4—4 of Figure 3;

Figure 5 is a perspective view of the top band; and

Figure 6 is a perspective view of the bottom band.

In carrying the invention into practice, I employ envelopes 10 of identical construction, each comprising a body member of double walls formed preferably from a single blank of material to provide a closed bottom 11 and an open upper end 12.

Each of these envelopes is provided adjacent to the open upper end with a band 13 of paper or any other suitable well-known material. The band is constructed in strip form and said band is made to embrace the walls of the envelope, the ends 14, 14 being secured by adhesive or the like to one wall of the envelope while leaving the band 15 free from the other wall.

The closed bottom of the envelope is inserted between the folds 16 and 17 of a second band 18 and, as shown in Figure 4, the fold 16 is secured to the wall 12' of the envelope. The ends 19 of this band are brought around the vertical edges of the envelope and secured in overlapped relation to the fold 16. The other fold 17 is left free and, with the front wall of the envelope, constitutes a pocket 20 whose upper end registers with the open side of the aforesaid band 13, as clearly shown in Figure 4.

Reference is now made to Figure 2, wherein A designates the originals of the usual sales slips. These slips, as they are made out in the regular transaction of business, are placed in the pocket of the envelope, the duplicates of which are given the customer or purchaser. B indicates what I have elected to call a chronological statement and C a duplicate thereof arranged behind B and separated therefrom by a slip of carbon or transfer paper C'. At the rear of B, C and C' may be arranged what I shall call a "ledger card" D.

The sales slips A constitute an unexposed record of all sales made to a particular customer and, as stated, these slips are the originals from which duplicates are struck and handed to a customer at the time of making a purchase. The slips B, C, C' and D constitute the visible record of account and the information contained thereon is a complete tally of the respective sales slips A. The two bands 13 and 18 provide means whereby the documents or records on the outside of the envelope may be held in attached position upon the envelope so as to virtually form a part thereof and to be arranged wholly within the boundary of the sides and ends of the envelope, as shown in Figure 2.

In the manner aforesaid, each envelope furnishes a means for assembling in one place or container all the documents and booking records commonly used in an ordinary business or mercantile transaction, and they are so arranged that any number of these envelopes can be indexed for easy and quick reference, following the system of a card index, as shown in Figure 1, it being understood that these envelopes are stood edgewise in order that their upper open ends will be in uniform horizontal alinement.

In using my system, the sales slips A constituting the original records of all sales made and their combination with the aforesaid documents B, C, C' and D make it unnecessary to keep the customary "day book". Being the originals, they may always be used in disputed cases as evidence of each transaction.

It is customary in the usual method of booking wherein sales slips are employed, to gather the slips and to sort and enter same in a day book, and to then journalize and enter the same in a ledger, or these slips are given to a bookkeeping machine operator who, with loose-leaf devices, enters them on statement and ledger sheets. This method is complicated and requires considerable handling of records and an expensive outfit of machinery and a skilled operator. By my improved method this costly, time-consuming and laborious operation may be eliminated.

The statement of account slip B is arranged so that the customer's name and address, and month and year will appear at the top of the statement, all at a point above the band 15. In view thereof, it is seen that the name of the customer is in plain view which serves as a guide in placing the envelope in the card index cabinet E, Figure 1. The statement slip B will, of course, be printed with the name of the merchant or concern making the sale, same appearing preferably at a point under the band 13.

Below the band 13 are day or date columns F; sales slips numbers columns G; and amount columns H. In these respective columns may be found a record on the statement of the account for a month or any desired period.

In use, the sales slips are assembled and sorted for each customer's account and entered on the statement daily and then placed in the envelope for future reference until the account is settled or transferred to a holding file (card indexed) to be kept as long as desired. In this manner, the merchant has a duplicate record of the account as the statement is made daily and at the end of the month he has all his statements made out ready to mail to his customers.

The ledger card or slip D may have entries made thereon as desired, i. e., the total for the month or period which the statement covers, or at such times when the customer may make a payment on account, in which case a credit slip in duplicate of the same size as the sales slips is made out and one copy of same placed inside the envelope, entry being made on the statement also.

While I have described use of my invention in connection with merchantile concerns, in the manner and for the purpose set forth, it shall be understood that I do not wish to be limited in this respect. For example, the system can be adapted to various lines, e. g., the monthly bank statement to depositors, the statement to occupy the same position on this envelope as for a mercantile concern, and the customer's account the same as the ledger card. Inside the envelope would be placed the deposit slips and the canceled checks to be returned to the depositor with the statement. The envelope shown herein can also accommodate contracts, leases, promissory notes and other documents on which periodical payments are made or credits allowed or for which memoranda of progress or the status of a case or transaction are desired, such memoranda to be entered on a card or slip of paper held beneath the bands outside the envelope.

While I have used the words, "sales slips," to describe a common form of original record for mercantile transactions, I use the words as synonymous with bill or invoice, which perform the same function as sales slips as memoranda or evidence of a sale of merchandise.

Although I have herein shown and described only one form of account system embodying my invention, it is to be understood that various changes and modifications may be made therein without departing from the spirit of the invention and the spirit and scope of the appended claims.

I claim as my invention:

1. An envelope folded from a single blank of material to provide front and rear walls, an open upper end and a closed bottom, a band of strip material extending across the front wall adjacent the upper end of the envelope in spaced relation to the front wall to provide a loop through which record sheets are adapted to be inserted from the top of the envelope, said band having its end portions extending across the rear wall and secured to the latter, a second band folded from a sheet of material to provide a U shaped portion of substantially the width of the envelope and in which the lower end of the latter is received, one of the folds of the U shaped portion being secured to the rear wall with the other fold spaced from the front wall to provide a pocket in which the lower ends of the record sheets are adapted to be received and having extended ends folded across and secured to the outer side of the first mentioned portion, to thereby close the ends of the pocket.

2. An envelope having front and rear walls and an open top, a U shaped band at the bottom of the envelope secured to the rear wall and free of the front wall to provide an exterior upwardly opening pocket and a second band adjacent the top of the envelope secured to the rear wall and extending across and free of the front wall to provide an exterior loop through which record sheets are adapted to be inserted from the top of the envelope into the pocket and co-operating with the pocket in removably holding the record sheets on the envelope.

WILLIAM M. FREDENBURG.